(12) United States Patent
Chae

(10) Patent No.: US 9,274,886 B2
(45) Date of Patent: Mar. 1, 2016

(54) DATA STORAGE DEVICE HAVING A REDUCED ERROR OCCURRENCE, OPERATING METHOD THEREOF, AND DATA PROCESSING SYSTEM INCLUDING THE SAME

(71) Applicant: SK hynix Inc., Gyeonggi-do (KR)

(72) Inventor: Chol Su Chae, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 233 days.

(21) Appl. No.: 14/055,538

(22) Filed: Oct. 16, 2013

(65) Prior Publication Data

US 2015/0019934 A1    Jan. 15, 2015

(30) Foreign Application Priority Data

Jul. 9, 2013    (KR) .................. 10-2013-0080212

(51) Int. Cl.
| | |
|---|---|
| *G06F 11/00* | (2006.01) |
| *G06F 12/00* | (2006.01) |
| *G06F 11/16* | (2006.01) |
| *G11C 29/04* | (2006.01) |
| *G11C 29/50* | (2006.01) |
| *G06F 11/10* | (2006.01) |

(52) U.S. Cl.
CPC ................................ *G06F 11/1048* (2013.01)

(58) Field of Classification Search
CPC ..... G06F 11/1048; G06F 11/10; G11C 29/42; G11C 7/1006; G11C 11/5642; G11C 29/021; G11C 29/50
USPC ................. 714/764, 721, 773, 746, 719, 819; 365/185.09, 185.33
See application file for complete search history.

(56) References Cited

U.S. PATENT DOCUMENTS

| | | | | |
|---|---|---|---|---|
| 5,867,429 | A  * | 2/1999 | Chen et al. ............... | 365/185.33 |
| 6,522,580 | B2 * | 2/2003 | Chen et al. ............... | 365/185.02 |
| 7,954,037 | B2 * | 5/2011 | Lasser et al. .................. | 714/763 |
| 8,305,811 | B2 * | 11/2012 | Jeon ......................... | 365/185.18 |
| 8,514,646 | B1 * | 8/2013 | Nan .............................. | 365/212 |
| 2013/0297986 | A1 * | 11/2013 | Cohen ........................... | 714/763 |

FOREIGN PATENT DOCUMENTS

| | | |
|---|---|---|
| KR | 1020100127406 | 12/2010 |
| KR | 1020120109848 | 10/2012 |

* cited by examiner

*Primary Examiner* — Phung M Chung
(74) *Attorney, Agent, or Firm* — IP & T Group LLP

(57) ABSTRACT

Operating a data storage device may include reading a first data group, detecting errors in the first data group, correcting the errors in the first data group, if the errors detected in the first data group can be corrected, and estimating a read retry estimation voltage for a subsequent read retry operation of a second data group that is different than the first data group and associated with the data storage device based on error correction data associated with the correcting the errors of the first data group.

30 Claims, 11 Drawing Sheets

DATA STORAGE DEVICE HAVING A REDUCED ERROR OCCURRENCE, OPERATING METHOD THEREOF, AND DATA PROCESSING SYSTEM INCLUDING THE SAME

CROSS-REFERENCES TO RELATED APPLICATION

The present application claims priority under 35 U.S.C. §119(a) to Korean application number 10-2013-0080212, filed on Jul. 9, 2013, in the Korean Intellectual Property Office, which is incorporated herein by reference in its entirety.

BACKGROUND

1. Technical Field

Various implementations relate to a data storage device, and more particularly, to a device capable of reducing an occurrence rate of read fails of a memory device to improve the reliability of a data storage device, an operating method thereof, and a data processing system including the same.

2. Related Art

The recent paradigm for computer surroundings has changed to a ubiquitous computing environment in which computer systems may be used anytime and anywhere. Thus, the use of portable electronic devices such as mobile phones, digital cameras, and notebook computers has rapidly increased. Such portable electronic devices generally use a data storage device using a memory device. The data storage device may be used as a main memory device or auxiliary memory device of the portable electronic devices.

Since the data storage device using a memory device has no mechanical driver, the data storage device has excellent stability and durability. Furthermore, the data storage device may have a high access speed and a small power consumption. A data storage device having such advantages may include a universal serial bus (USB) memory device, a memory card having various interfaces, or a solid state drive (SSD).

Write data requested by a host may be stored in a memory device of a data storage device. The memory device of the data storage device may cause a read fail due to various reasons. For example, data stored in a memory cell of the memory device may be sensed as if the data was changed because of interference between memory cells. In addition, data stored in a memory cell of the memory device may be changed by disturbance between memory cells. For another example, data stored in a memory cell of the memory device may be changed when the memory cell is worn out through repeated erase/program operations. In addition, if the data stored in the memory cell is changed or identified as being changed then, the data stored in the memory cell may contain an error. Due to the error contained in the data, the memory device may cause a read fail.

The data storage device may perform an error correction algorithm for checking and correcting the error contained in the data, in order to process the read fail of the memory device.

SUMMARY

Various implementations are directed to a device capable of lowering an occurrence rate of read fails of a memory device to improve the reliability of a data storage device, an operating method thereof, and a data processing system including the same.

An exemplary operating method of a data storage device may include steps of reading a first data group; detecting errors contained in the first data group; correcting the errors of the first data group, if the errors detected from the first data group can be corrected; and estimating a read retry estimation voltage based on error correction data generated based on the step of correcting the errors of the first data group.

An exemplary data storage device may include a nonvolatile memory device; and a memory controller configured to read a first data group from the nonvolatile memory device, correct errors detected from the read first data group, and estimate a read retry estimation voltage based on error correction data acquired when the detected errors are corrected.

An exemplary data processing system may include a host device; and a data storage device configured to store data processed by the host device, wherein the data storage device comprises a nonvolatile memory device; and a memory controller configured to read a first data group from the nonvolatile memory device, correct errors detected from the read first data group, and estimate a read retry estimation voltage based on error correction data acquired when the detected errors are corrected.

BRIEF DESCRIPTION OF THE DRAWINGS

Features, aspects, and implementations are described in conjunction with the attached drawings, in which.

DETAILED DESCRIPTION

Exemplary implementations of the present invention will be described below in more detail with reference to the accompanying drawings. The present invention may, however, be implemented in different forms and should not be construed as limited to the implementations set forth herein. Rather, these implementations are provided so that this disclosure will be thorough and complete, and will fully convey the scope of the present invention to those skilled in the art.

The drawings are not necessarily to scale and in some instances, proportions may have been exaggerated in order to clearly illustrate features of the implementations. In this specification, specific terms have been used. The terms are used to describe the present invention, and are not used to qualify the sense or limit the scope of the present invention.

In this specification, "and/or" represents that one or more of components arranged before and after "and/or" is included. Furthermore, "connected/coupled" represents that one component is directly coupled to another component or indirectly coupled through an intermediate component. In this specification, a singular form may include a plural form as long as it is not specifically mentioned in a sentence. Furthermore, the terms "include/comprise" or "including/comprising" mean that one or more components, steps, operations, or elements exist or may be added.

Hereafter, the exemplary implementations of the present invention will be described with reference to the drawings.

Figure 1:
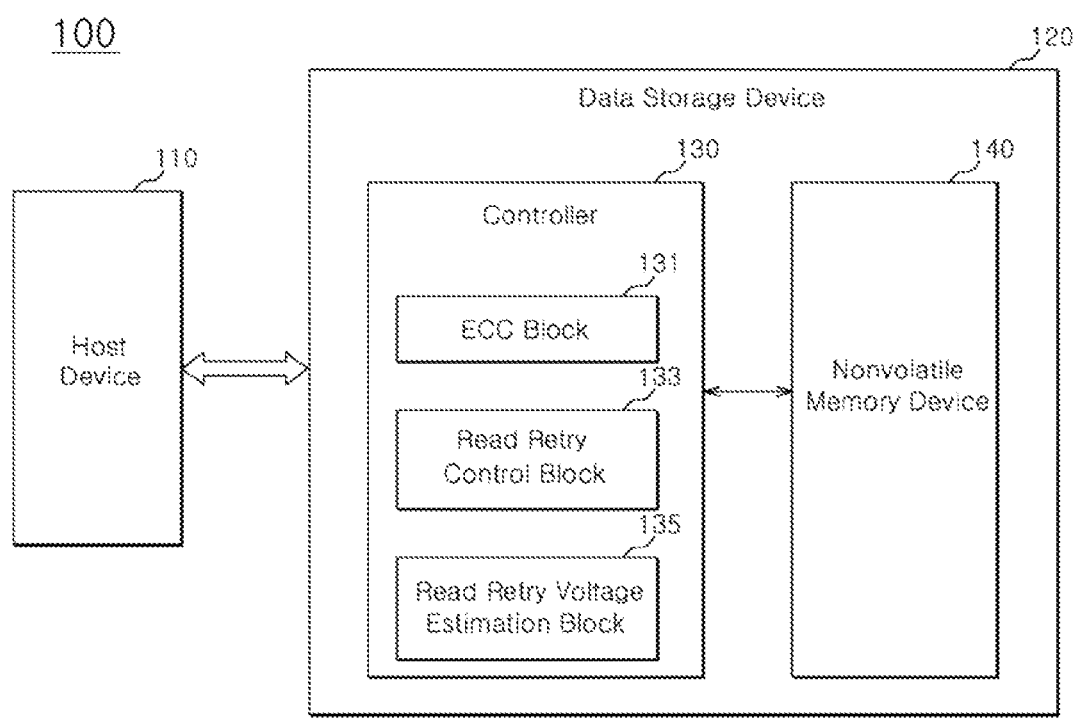
FIG. 1 is a block diagram illustrating an exemplary data processing system.

FIG. 1 is a block diagram illustrating an exemplary data processing. Referring to FIG. 1, the data processing system 100 includes a host device 110 and a data storage device 120.

The host device 110 may include, for example, a portable electronic device, such as a mobile phone, an MP3 player, a lap-top computer, or an electronic device, such as a desktop computer, a game machine, a television (TV), a beam projector, or a car entertainment system.

The data storage device 120 may operate in response to a request from the host device 110. The data storage device 120 may store data processed by the host device 110. That is, the data storage device 120 may be used as an auxiliary memory device of the host device 110.

The data storage device 120 may include a controller 130 and a nonvolatile memory device 140. The controller 130 and the nonvolatile memory device 140 may be implemented a memory card connected to the host device 110 through an interfaces Alternatively, the controller 130 and the nonvolatile memory device 140 may be implemented a solid state drive (SSD) connected to the host device 110 through an interface.

The controller 130 may control the nonvolatile memory device 140 in response to a request from the host device 110. For example, the controller 130 may provide data, read from the nonvolatile memory device 140, to the host device 110. In another example, the controller 130 may store data, provided from the host device 110, in the nonvolatile memory device 140. For this operation, the controller 130 may drive firmware.

The nonvolatile memory device 140 may be implemented a NAND flash memory device. However, the nonvolatile memory device 140 may be implemented any other type of nonvolatile memory device. For example, the nonvolatile memory device 140 may be implemented a NOR flash memory device, a ferroelectric RAM (FRAM), a magnetic RAM (MRAM) using a tunneling magneto-resistive (TMR) layer, a phase change memory device (PRAM) using chalcogenide alloys, or a resistive memory device (RERAM) using a transition metal oxide. The nonvolatile memory device 140 may also be implemented a combination of a NAND flash memory device and one or more of the above-described various nonvolatile memory devices.

The controller 130 may include an error correction code (ECC) block 131, a read retry control block 133, or a read retry voltage estimation block 135. The controller 130 may further include a working memory device (not illustrated) to store firmware (or software) driven by the controller 130 and data required to drive the firmware (or software).

Each of the ECC block 131, the read retry control block 133, or the read retry voltage estimation block 135 may be implemented a digital circuit, an analog circuit, or a combination of digital circuit and analog circuit. For another example, each of the ECC block 131, the read retry control block 133, or the read retry voltage estimation block 135 may be implemented in the form of software which is executed according to the control of the controller 130. In another example, each of the ECC block 131, the read retry control block 133, or the read retry voltage estimation block 135 may be implemented a hardware or a combination of hardware and software.

The ECC block 131 may perform an error check operation to determine whether or not the data contains errors. The ECC block 131 may further perform an error correction operation to removing any errors contained in the data. For example, the ECC block 131 may identify a number of errors contained in data read from the nonvolatile memory device 140. If the read data contains a correctable number of errors, the ECC block 131 may correct the detected errors. If the errors contained in the read data are corrected by the ECC block 131 (hereafter, referred to as "ECC pass"), a read fail of the data storage device 120 does not occur. However, if the errors contained in the read data are not corrected by the ECC block 131, or if the number of errors contained in the read data is larger than an error correction ability of the ECC block 131 (hereafter, referred to as "ECC fail"), then a read fail of the data storage device 120 may occur.

The read retry control block 133 may control a read operation of the nonvolatile memory device 140. The read retry control block 133 may repeat the read retry operation until any errors contained in the data read from the nonvolatile memory device 140 are corrected and an ECC pass occurs. For example, the read retry control block 133 may control a retry read operation to be performed at a read voltage that is different than a read voltage used during a previous read operation. For example, the read retry control block 133 may provide a read retry voltage Vrt to the nonvolatile memory device 140 until the read retry operation is performed.

The read retry operation may be repeated until the number of errors contained in the read data becomes less than or equal to a number of errors that may be corrected by the ECC block 131. Whenever the read retry operation is performed, the read retry voltage Vrt is changed. Thus, it is important to set an optimal read retry voltage, in order to improve the performance of the read operation.

The read retry voltage estimation block 135 may estimate a read retry voltage before the read retry operation is performed. In other words, the read retry voltage estimation block 135 may preset a read retry voltage based on error correction data (for example, the number of corrected error bits), when an ECC pass is determined. The read retry voltage estimated through the read retry voltage estimation operation (hereafter, referred to as "read retry estimation voltage") is used as an initial read retry voltage of a read retry operation which is performed when an ECC fail occurs (hereafter, referred as "read retry estimation voltage").

A value of the read retry estimation voltage may be stored in the read retry estimation block 135, until a read retry operation is performed. Alternatively, the value of the read retry estimation voltage may be communicated to the read retry control block 133, and stored in the read retry control block 133 until the read retry operation is performed. Alternatively, the value of the read retry estimation voltage may be stored in a working memory device (not illustrated) of the controller 130.

As described above, the read retry operation is performed when an ECC fail occurs. Thus, since the read retry voltage is determined when an ECC pass occurs, an optimal read retry voltage may be set within a short time.

Figure 2:
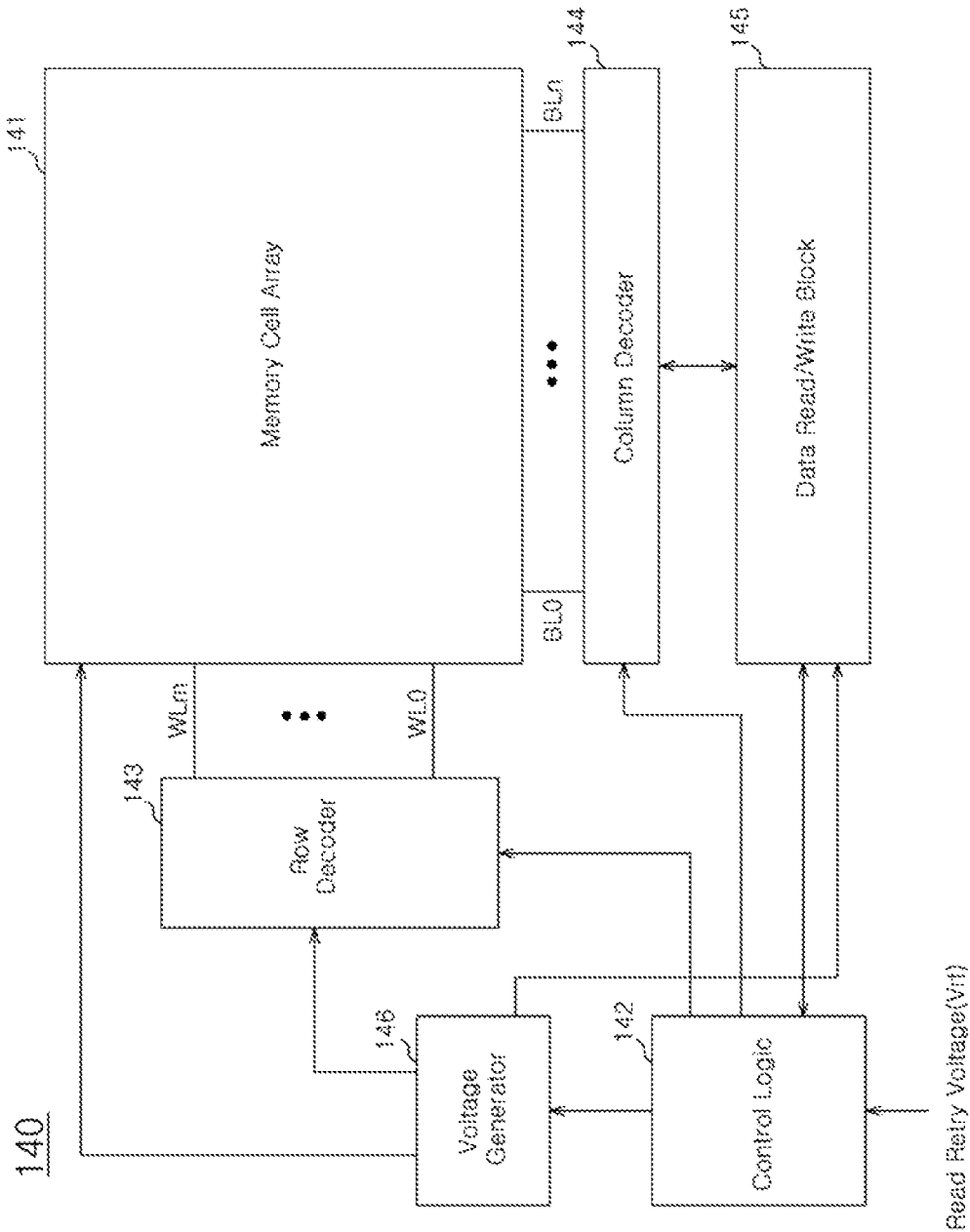
FIG. 2 is a block diagram illustrating an exemplary nonvolatile memory device.

FIG. 2 is a block diagram illustrating an exemplary nonvolatile memory device. Referring to FIG. 2, the nonvolatile memory device 140 may include a memory cell array 141, a control logic 142, a row decoder 143, a column decoder 144, a data read/write block 145, or a voltage generator 146.

The memory cell array 141 may include a plurality of memory cells arranged at intersections between word lines WL0 to WLm and corresponding bit lines BL0 to BLn. Each of the memory cells may store one-bit data or two or more-bit data. A memory cell capable of storing one-bit data is referred to as a single level cell (SLC). The SLC is programmed to have a threshold voltage corresponding to an erase state or one program state. A memory cell capable of storing two or more-bit data is referred to as a multi-level cell (MLC). The MLC is programmed to have a threshold voltage corresponding to an erase state or any one of a plurality of program states.

The control logic 142 may control overall operations of the nonvolatile memory device 140, in response to a control signal provided from an external device. For example, the control logic 142 may control the row decoder 143, the column decoder 144, the data read/write block 145, or the voltage generator 146 based on an operation mode set by the controller 130. The operation mode may include, for example, an erase operation, a program operation, a read operation, or a read retry operation.

The control logic 142 may control the voltage generator 146 to generate a voltage that is to be used during a read retry operation, based on the read retry voltage Vrt provided from the controller 130. The control logic 142 may control the nonvolatile memory device 140 to store the value of the read retry voltage Vrt in an operation setting information storage area of the nonvolatile memory device 140. For example, the control logic 142 may control an operation setting information storage area of the memory cell array 141 to store the value of the read retry voltage Vrt. Alternatively, the control logic 142 may control a content addressable memory (CAM) block (not illustrated) to store the value of the read retry voltage Vrt.

The row decoder 143 may be connected to the memory cell array 110 through the word lines WL0 to WLm. The row decoder 143 may decode an address pre-decoded by the control logic 142. The row decoder 143 may select and drive the word lines WL0 to WLm according to the decoding result. For example, the row decoder 143 may provide a word line voltage provided from the voltage generator 146 to a selected word line and unselected word lines.

The column decoder 144 may be connected to the memory cell array 110 through the bit lines BL0 to BLn. The column decoder 144 may decode an address pre-decoded by the control logic 160. The column decoder 144 may sequentially connect the bit lines BL0 to BLn to the data read/write block 145 by the predetermined unit according to the decoding result.

The data read/write block 145 may operate as a write driver or a sense amplifier depending on the operation mode. For example, the data read/write block 145 may store data, provided from an external device, in the memory cell array 110 during a program operation. Alternatively, the data read/write block 140 may read data from the memory cell array 110 during a read operation or read retry operation.

The voltage generator 146 may be controlled by the control logic 142 to generate a voltage to be used for an operation of the nonvolatile memory device 140. For example, the voltage generator 146 may generate a word line voltage (for example, a program voltage, a read voltage, a pass voltage, or the like) that may be provided to the word lines WL0 to WLm, a based on the operation mode. For example, during a read operation, the voltage generator 146 may generate a read voltage, to be used for a read retry operation, based on the read retry voltage Vrt provided from the controller 130 through the control logic 142. The voltage generator 146 may generate a voltage to be provided to a bulk (for example, well region) in which the memory cell array 141 may be formed. The voltage generator 146 may also provide a voltage to be provided to the data read/write block 145.

Figure 3:
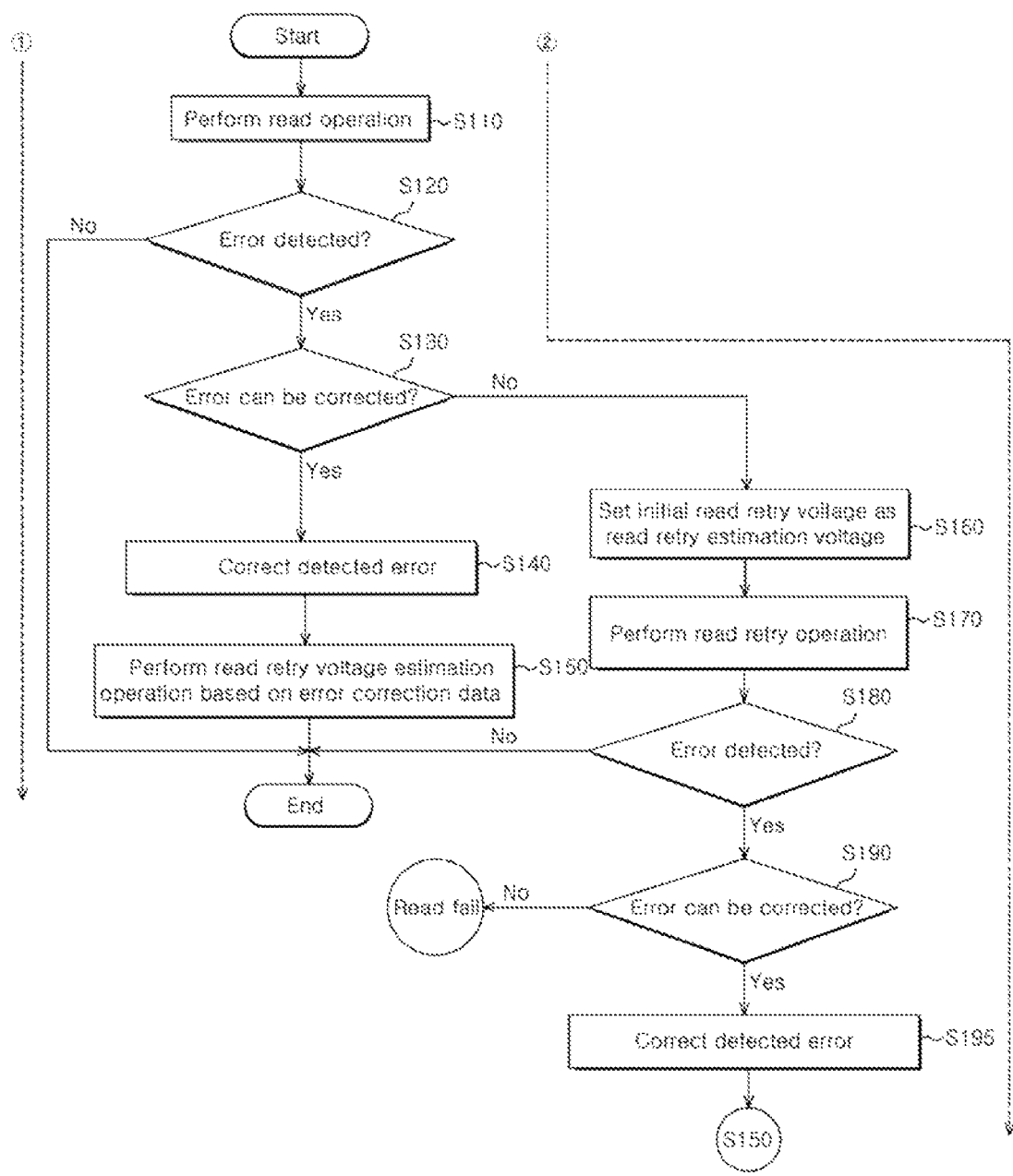
FIG. 3 is a flowchart showing a method of operating an exemplary data storage device.

FIG. 3 is a flowchart explaining an operating method of an exemplary data storage device. In an example shown in FIG. 3, suppose that a current read operation indicated by an arrow ① is determined as an ECC pass and a next read operation indicated by an arrow ② is determined as an ECC fail. Furthermore, suppose that a series of operations, that is, an operation of detecting an error of read data at step S120, an operation of determining whether or not the detected error can be corrected at step S130, and an operation of correcting the error at step S140 are defined as an ECC operation.

FIG. 3 illustrates a process of estimating a read retry voltage when the current read operation is determined as an ECC pass, in order to prepare for a read retry operation, which may occur if a next read operation is determined as an ECC fail.

First, the current read operation will be described as follows.

At step S110, the controller 130 performs a read operation on the nonvolatile memory device 140. For example, since the nonvolatile memory device 140 performs a read operation by the page, data read through the read operation may correspond to a data group including a plurality of data bits.

At step S120, the ECC block 131 detects whether or not the read data contains an error. The error detection operation of the ECC block 131 may be performed through parity data. If no error is detected in the read data, then the read operation is ended. If an error is detected in the read data, the procedure proceeds to step s130.

At step S130, the ECC block 131 determines whether or not the detected error can be corrected. If it is determined that the detected error can be corrected (that is, the number of errors contained in the read data is smaller than the error correction ability of the ECC block 131), then the procedure proceeds to step S140.

At step S140, the ECC block 131 corrects the error contained in the read data.

If the data read is determined as an ECC pass through the operations of the steps S110 to S140, an operation of estimating a read retry voltage is performed. That is, at step S150, the read retry voltage estimation block 135 performs a read retry voltage estimation operation based on the error correction data of the step S140. The read retry voltage estimation operation will be described in detail with reference to FIGS. 4 and 5.

After the read data is determined as an ECC pass and the read retry voltage estimation operation is performed, a next read operation may be performed.

At step S110, the controller 130 performs a read operation on the nonvolatile memory device 140. For example, the nonvolatile memory device 140 performs a read operation by the page. Thus, data read through the read operation may correspond to a data group including a plurality of data bits.

At step S120, the ECC block 131 detects whether or not the read data contain errors. When no errors are detected from the read data, the read operation is ended. Thus, the read retry operation is not performed. When errors are detected from the read data, the procedure proceeds to step S130.

At step S130, the ECC block 131 determines whether the detected errors can be corrected or not. When it is determined that the detected errors cannot be corrected (that is, the number of errors contained in the read data is larger than the error correction ability of the ECC block 131), the procedure proceeds to step S160. When it is determined that the detected errors can be corrected, a read retry voltage estimation operation may be performed again, and a read retry estimation voltage may be reset.

If an ECC fails is determined at step S130, then the process proceeds to step S160 to perform a read retry operation. At step S160, the read retry control block 133 may set an initial read retry voltage, which is estimated based on an ECC pass, as described above.

At step S170, the read retry control block 133 may perform a read retry operation using the initial read retry voltage. As discussed above, the read retry control block 133 may control the read retry control block 135 to repeatedly perform a read retry operation. If the read retry operation is repeatedly performed, then the read retry voltage provided to the nonvolatile memory device 140 may be varied.

At step S180, after the read retry operation, any errors in the data read through the read retry operation may be detected. If no error is detected, then the read operation may be ended. If an error is detected, then the procedure proceeds to step S190.

At step S190, the ECC block 131 determines whether the detected error can be corrected. If it is determined that the detected error cannot be corrected (that is, the number of errors contained in the read data is larger than the error correction ability of the ECC block 131), then the read operation may fail, and a procedure for processing a read fail may be performed. If it is determined that the error detected through the read retry operation can be corrected, then the procedure proceeds to step S195.

At step S195, the ECC block 131 may correct the error contained in the read data. Then, the procedure may proceed to the step S150. Through the above-described procedure, the read retry voltage estimation operation may be performed again, and the read retry estimation voltage may be reset, in order to perform a next read operation.

Figure 4:
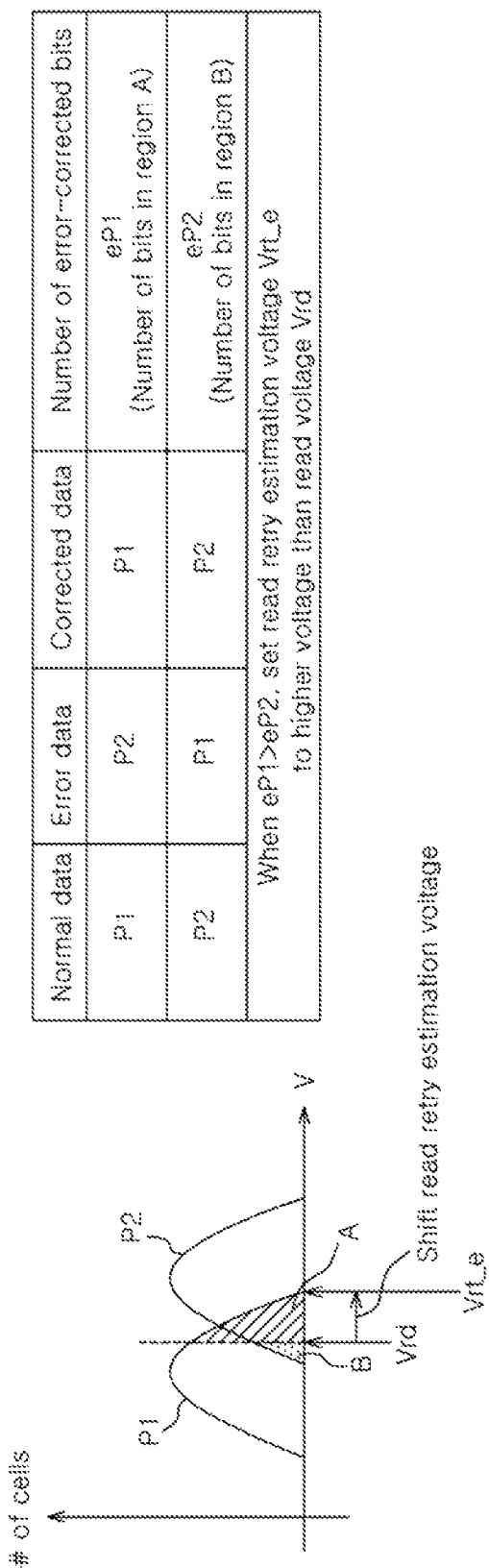
FIGS. 4 and 5 are diagrams explaining a read retry voltage estimation operation of an exemplary data storage device.
Figure 5:
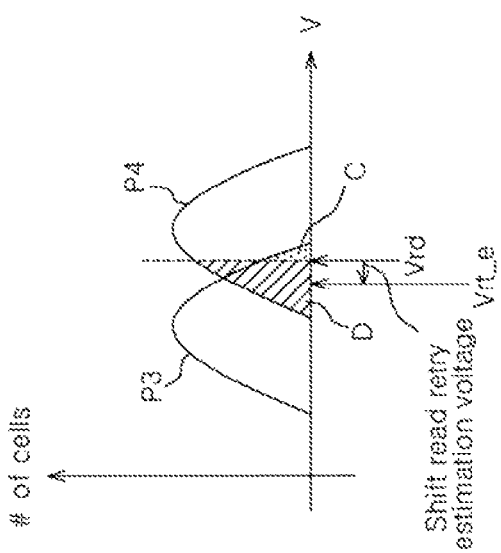

FIGS. 4 and 5 are diagrams explaining the read retry voltage estimation operation of an exemplary data storage device. The read retry voltage estimation operation includes an operation of dividing a read data group into first state data and second state data according to a reference voltage, for example, a read voltage, and determining a shift direction and a shift amount of a read retry estimation voltage based on a number of corrected error bits of the first state data and a number of corrected error bits of the second state data.

FIG. 4 illustrates an operation of estimating a read retry estimation voltage Vrt_e based on data obtained by correcting errors of a data group read according to the read voltage Vrd. The operation of reading data based on the read voltage Vrd may be performed at the step S110 of FIG. 3, and the operation of correcting the errors of the read data may be performed at the step S140 of FIG. 3.

In FIG. 4, suppose that in a normal state, a threshold voltage distribution P1 is lower than the reference voltage, for example, the read voltage Vrd and a threshold voltage distribution P2 is higher than the reference voltage, for example, the read voltage Vrd. For example, if the threshold voltage distributions P1 and P2 may be divided on the basis of the read voltage Vrd, then memory cells may store normal data containing no errors.

In the above-example, memory cells having threshold voltages that are located in a region "A," among memory cells having the threshold voltage distribution P1, may store error data. That is, the data stored in the memory cells having threshold voltages that are located in the region "A" are determined to have a data value (P2 state value) that is different from a normal data value (P1 state value). Thus, the data may contain errors (hereafter, referred to as "P1 state errors"). The error data (P2 state value) stored in the memory cells having threshold voltages that are located in the region "A" are corrected to the normal data value (P1 state value) through the error correction operation. Hereafter, the number of bits in which P1 state errors are corrected through the error correction operation is referred to as "eP1".

Furthermore, in the above-example, it may be determined that memory cells having threshold voltages located in a region "B," among memory cells constituting the threshold voltage distribution P2, store error data. That is, data stored in the memory cells having threshold voltages are that located in the region "B" are determined to have a data value (P1 state value) that is different from a normal data value (P2 state value). Thus, the data may contain errors (hereafter, referred to as "P2 state errors"). The error data (P1 state value) stored in the memory cells having threshold voltages that are positioned in the region "B" are corrected into the normal data values (P2 state value) through the error correction operation. The number of bits in which P2 state errors are corrected through the error correction operation is referred to as "eP2".

If eP1 is larger than eP2, it means that the data read according to the read voltage Vrd contains a larger number of P1 state errors than the number of P2 state errors. Thus, the read retry estimation voltage Vrt_e is set to a higher level than the read voltage Vrd to decrease the number of P1 state errors during the read retry operation.

If the read retry estimation voltage Vrt_e is set to a higher level than the read voltage Vrd, then the level of the read retry estimation voltage Vrt_e is set based on a difference between eP1 and eP2. For example, the shift amount of the read retry estimation voltage Vrt_e, which is shifted on the basis of the read voltage Vrd, may increase as the difference between eP1 and eP2 increases. For another example, the shift amount of the read retry estimation voltage Vrt_e, which is shifted on the basis of the read voltage Vrd, may decrease as the difference between eP1 and eP2 decreases.

FIG. 5 illustrates another operation of estimating a read retry estimation voltage Vrt_e based on data obtained by correcting errors of a data group read according to the read voltage Vrd. The operation of reading data according to the read voltage Vrd may be performed at the step S110 of FIG. 3, and the operation of correcting errors of the read data may be performed at the step S140 of FIG. 3.

In FIG. 5, suppose that a normal state corresponds to a state in which a threshold voltage distribution P3 is lower than the reference voltage (the read voltage Vrd) and a threshold voltage distribution P4 is higher than the reference voltage (the read voltage Vrd). That is, suppose that, when the threshold voltage distributions P3 and P4 may be divided on the basis of the read voltage Vrd, memory cells store normal data contain no errors.

According to the above-described supposition, it may be determined that memory cells, of which the threshold voltages are positioned in a region "C" among memory cells constituting the threshold voltage distribution P3, store error data. That is, the data stored in the memory cells, of which the threshold voltages are positioned in the region "C," may be determined to be a data value (P4 state value) different from a normal data value (P3 state value). Thus, the data may contain errors (hereafter, referred to as "P3 state errors"). The error data (P4 state value) stored in the memory cells, of which the threshold voltages are positioned in the region "C," may be corrected into the normal data value (P3 state value) through the error correction operation. Hereafter, the number of bits in which the P3 state errors are corrected through the error correction operation is referred to as "eP3".

Furthermore, according to the above-described supposition, it may be determined that memory cells, of which the threshold voltages are positioned in a region "D," among memory cells constituting the threshold voltage distribution P4, may store error data. That is, the data stored in the memory cells, of which the threshold voltages are positioned in the region "D," may be determined to be a data value (P3 state value) different from a normal data value (P4 state value). Thus, the data may contain errors (hereafter, referred to as "P4 state errors"). The error data (P3 state value) stored in the memory cells, of which the threshold voltages are positioned in the region "D," are corrected into the normal data value (P4 state value) through the error correction operation. The number of bits in which the P4 state errors are corrected through the error correction operation is referred to as "eP4."

If eP4 is larger than eP3, it means that the data read according to the read voltage Vrd contains a larger number of P4 state errors than the number of P3 state errors. Thus, the read retry estimation voltage Vrt_e is set to a lower level than the read voltage Vrd, such that the number of P4 state errors may decrease during the read retry operation.

If the read retry estimation voltage Vrt_e is set to a lower level than the read voltage Vrd, then the level of the read retry estimation voltage Vrt_e is set according to a difference between eP3 and eP4. For example, the shift amount of the read retry estimation voltage Vrt_e, which is shifted on the basis of the read voltage Vrd, may increase as the difference between eP3 and eP4 increases. For another example, the shift amount of the read retry estimation voltage Vrt_e, which is shifted on the basis of the read voltage Vrd, may decrease as the difference between eP3 and eP4 decreases.

Figure 6:
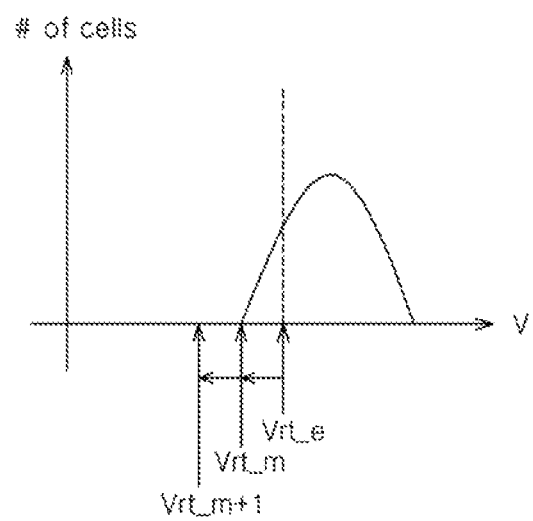
FIGS. 6 and 7 are diagrams explaining a read retry operation of an exemplary data storage device.
Figure 7:
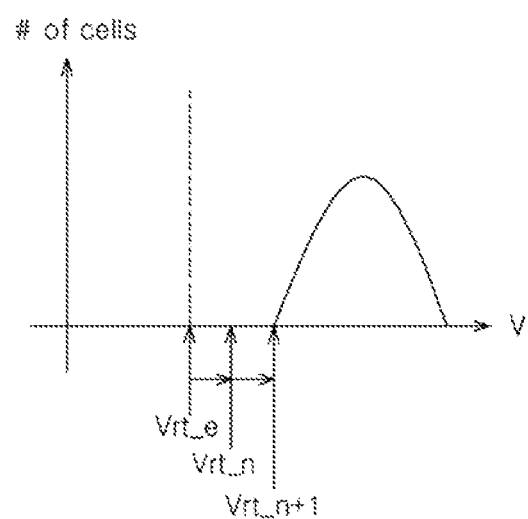

FIGS. 6 and 7 are diagrams explaining the read retry operation of the exemplary data storage device.

As described above, the read retry operation is performed when the read data are determined as an ECC fail. The read retry operation may be repeated until the number of errors contained in the read data becomes smaller than the error correction ability of the ECC block 131. Furthermore, the read retry voltage may be varied whenever the read retry operation is repeated.

Referring to FIG. 6, an initial read retry operation may be performed according to a read retry estimation voltage Vrt_e, a next read retry operation may be performed according to a read retry voltage Vrt_m lower than the read retry estimation voltage Vrt_e, and another next read retry operation may be performed according to a read retry voltage Vrt_m+1 lower than the read retry voltage Vrt_m.

Furthermore, referring to FIG. 7, an initial read retry operation may be performed according to a read retry estimation voltage Vrt_e, a next read retry operation may be performed according to a read retry voltage Vrt_n lower than the read retry estimation voltage Vrt_e, and another next read retry operation may be performed according to a read retry voltage Vrt_n+1 lower than the read retry voltage Vrt_n.

Figure 8:
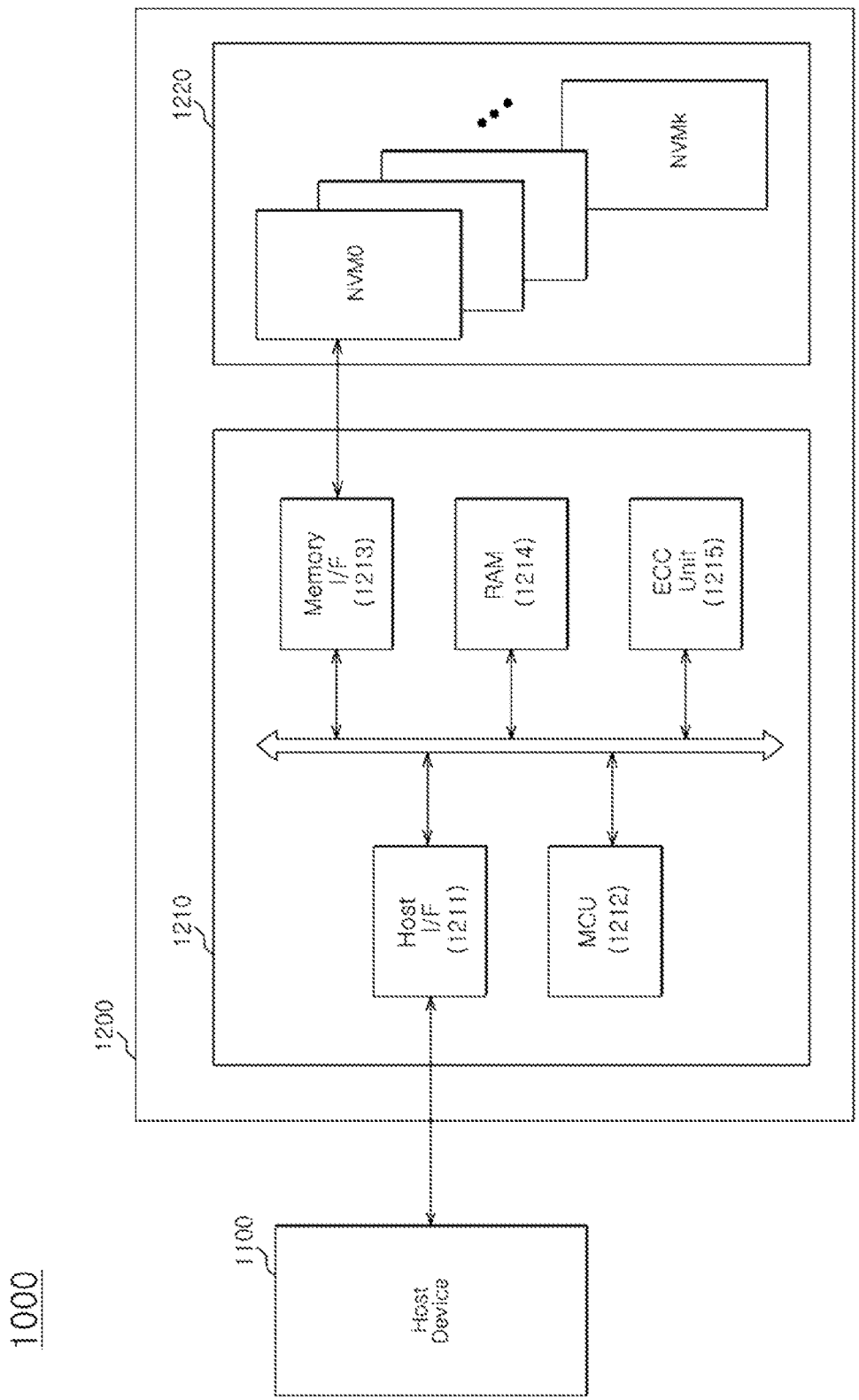
FIG. 8 is a block diagram illustrating an exemplary data processing system.

FIG. 8 is a block diagram illustrating a data processing system according to an implementation of the present invention. Referring to FIG. 8, the data processing system 1000 may include a host device 1100 and a data storage device 1200. The data storage device 1200 may include a controller 1210 and a data storage medium 1220. The data storage device 1200 may be connected to the host device 1100, such as a desktop computer, a notebook computer, a digital camera, a mobile phone, an MP3 player, a game machine, or the like. The data storage device 1200 is also referred to as a memory system.

The controller 1210 may be coupled to the host device 1100 and the data storage medium 1220. The controller 1210 may access the data storage medium 1220 in response to a request from the host device 1100. For example, the controller 1210 may control a read, program, or erase operation of the data storage medium 1220. The controller 1210 may drive firmware for controlling the data storage medium 1220. The controller 1210 may perform a read retry operation based on the read retry voltage estimation operation and the read retry estimation voltage according to the implementation of the present invention. Thus, a read fail of the data storage medium 1220 may be corrected and prevented, and the reliability of the data storage device 1200 may be improved.

The controller 1210 may include well-known components, such as a host interface 1211, a micro control unit 1212, a memory interface 1213, a RAM 1214, or an ECC unit 1215.

The micro control unit 1212 may control overall operations of the controller 1210 in response to a request of the host. The RAM 1214 may be used as a working memory of the micro control unit 1212. The RAM 1214 may temporarily store data read from the data storage medium 1220 or data provided from the host device 1100.

The host interface 1211 may interface the host device 1100 and the controller 1210. For example, the host interface 1211 may communicate with the host device 1100 through one of various interface protocols such as a USB (Universal Serial Bus) protocol, a MMC (Multimedia Card) protocol, a PCI (Peripheral Component Interconnection) protocol, a PCI-E (PCI-Express) protocol, a PATA (Parallel Advanced Technology Attachment) protocol, a SATA (Serial ATA) protocol, a SCSI (Small Computer System Interface) protocol, a SAS (Serial Attached SCSI), or an IDE (Integrated Drive Electronics) protocol.

The memory interface 1213 may interface the controller 1210 and the data storage medium 1220. The memory interface 1213 may provide a command and address to the data storage medium 1220. Furthermore, the memory interface 1213 may exchange data with the data storage medium 1220.

The ECC unit 1215 may detect an error of the data read from the data storage medium 1220. Furthermore, the ECC unit 1215 may correct the detected error, when the detected error falls within a correction range. Meanwhile, the ECC unit 1215 may be provided inside or outside the controller 1210 depending on the memory system 1000.

The controller 1210 and the data storage medium 1220 may be integrated to form a solid state drive (SSD).

As another example, the controller 1210 and the data storage medium 1220 may be integrated into one semiconductor device to form a memory card. For example, the controller 1210 and the data storage medium 1220 may be integrated into one semiconductor device to form a PCMCIA (personal computer memory card international association) card, a CF (compact flash) card, a smart media card, a memory stick, a multi-media card (MMC, RS-MMC, or MMC-micro), an SD (secure digital) card (SD, Mini-SD, or Micro-SD), or a UFS (universal flash storage) card.

As another example, the controller 1210 or the data storage medium 1220 may be mounted as various types of packages. For example, the controller 1210 or the data storage medium 1220 may be packaged and mounted according to various methods, such as POP (package on package), ball grid arrays (BGAs), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat package (MQFP), thin quad flat package (TQFP), small outline IC (SOIC), shrink small outline package (SSOP), thin small outline package (TSOP), thin quad flat package (TQFP), system in package (SIP), multi-chip package (MCP), wafer-level fabricated package (WFP), or a wafer-level processed stack package (WSP).

Figure 9:
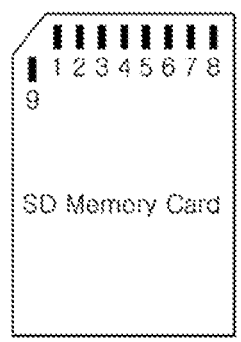
FIG. 9 illustrates an exemplary memory card.

FIG. 9 illustrates a memory card according to an implementation of the present invention. FIG. 9 illustrates the exterior of an SD (secure digital) card among memory cards.

Referring to FIG. 9, the SD card may include one command pin (for example, second pin), one clock pin (for example, fifth pin), four data pins (for example, first, seventh, eighth, and ninth pins), and three power supply pins (for example, third, fourth, and sixth pins).

Through the command pin (second pin), a command and a response signal are transferred. In general, the command may be transmitted to the SD card from a host, and the response signal may be transmitted to the host from the SD card.

The data pins (first, seventh, eighth, and ninth pins) may be divided into receive (Rx) pins for receiving data transmitted from the host and transmit (Tx) pins for transmitting data to the host. The Rx pins and the Tx pins, respectively, form a pair to transmit differential signals.

The SD card may perform the read retry voltage estimation operation and the read retry operation according to the implementation of the present invention. Thus, the reliability of the SD card may be improved.

Figure 10:
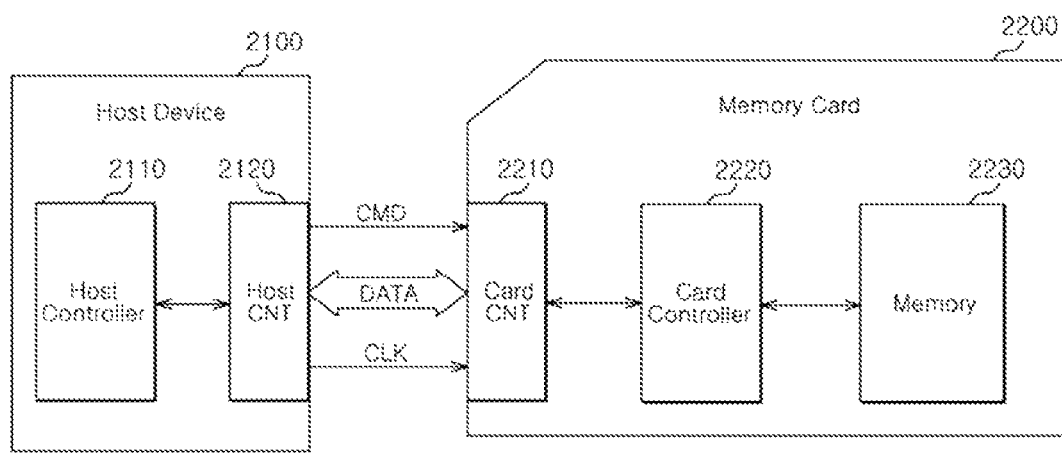
FIG. 10 is a block diagram illustrating the internal configuration of the memory card illustrated in FIG. 9 and the connection relation between the memory card and a host.

FIG. 10 is a block diagram illustrating the internal configuration of the exemplary memory card illustrated in FIG. 9 and the connection relation between the memory card and a host. Referring to FIG. 10, the data processing system 2000 may include a host device 2100 and a memory card 2200. The host device 2100 may include a host controller 2110 and a host connection unit 2120. The memory card 2200 may include a card connection unit 2210, a card controller 2220, and a memory device 2230.

The host connection unit 2120 and the card connection unit 2210 may include a plurality of pins. The pins may include a command pin, a clock pin, a data pin, or a power supply pin. The number of pins may differ depending on the type of the memory card 2200.

The host device 2100 may store data in the memory card 2200 or may read data stored in the memory card 2200.

The host controller 2110 may transmit a write command CMD, a clock signal CLK generated from a clock generator (not illustrated) inside the host device 2100, and data DATA to the memory card 2200 through the host connection unit 2120. The card controller 2220 may operate in response to the write command received through the card connection unit 2210. The card controller 2220 may store the received data DATA in the memory device 2230, using a clock signal generated from a clock generator (not illustrated) inside the card controller 2220, according to the received clock signal CLK.

The host controller 2110 may transmit a read command CMD and the clock signal CLK generated from the clock generator inside the host device 2100 to the memory card 2200 through the host connection unit 2120. The card controller 2220 may operate in response to the read command received through the card connection unit 2210. The card controller 2220 may read data from the memory device 2230 using the clock signal generated from the clock generator inside the card controller 2220, according to the received clock signal CLK, and may transmit the read data to the host controller 2110.

Figure 11:
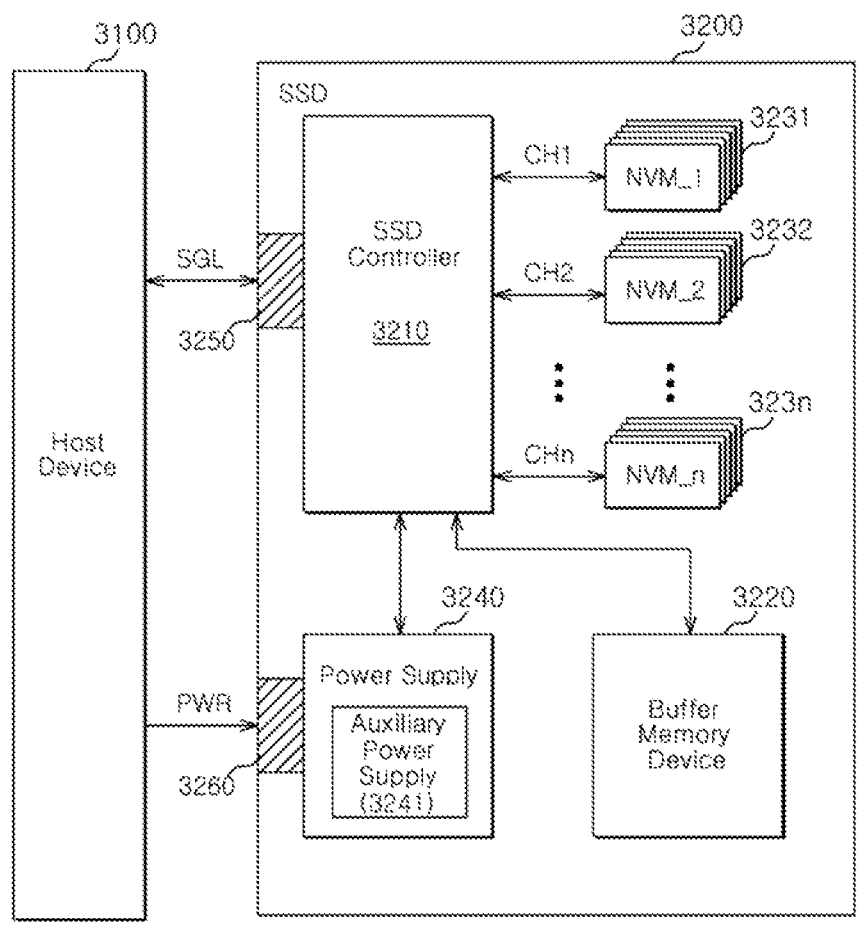
FIG. 11 is a block diagram illustrating an exemplary solid state drive (SSD)

FIG. 11 is a block diagram illustrating an exemplary solid state drive (SSD). Referring to FIG. 11, a data processing system 3000 may include a host device 3100 and an SSD 3200.

The SSD 3200 may include an SSD controller 3210, a buffer memory device 3220, a plurality of nonvolatile memory devices 3231 to 323n, a power supply 3240, a signal connector 3250, or a power connector 3260.

The SSD 3200 may operate in response to a request of the host device 3100. That is, the SSD controller 3210 may access the nonvolatile memory devices 3231 to 323n in response to a request from the host device 3100. For example, the SSD controller 3210 may control read, program, or erase operations of the nonvolatile memory devices 3231 to 323n. Furthermore, the SSD controller 3210 may perform a read retry operation based on the read retry voltage estimation operation and the read retry estimation voltage, as described above. Thus, read fails of the nonvolatile memory devices 3231 to 323n may be corrected and prevented, and thus the reliability of the SSD 3200 may be improved.

The buffer memory device 3220 may temporarily store data that is to be stored in the nonvolatile memory devices 3231 to 323n. Furthermore, the buffer memory device 3220 may temporarily store data read from the nonvolatile memory devices 3231 to 323n. The data temporarily stored in the buffer memory device 3220 are transmitted to the host device 3100 or the nonvolatile memory devices 3231 to 323n, according to the control of the SSD controller 3210.

The respective nonvolatile memory devices 3231 to 323n are coupled to the SSD controller 3210 through a plurality of channels CH1 to CHn. One channel may be coupled to one or more nonvolatile memory devices. The nonvolatile memory devices coupled to one channel may be coupled to the same signal bus and data bus.

The power supply 3240 may provide power PWR inputted through the power connector 3260 into the SSD 3200. The power supply 3240 includes an auxiliary power supply 3241. The auxiliary power supply 3241 may supply power to normally terminate the SSD 3200, when sudden power off occurs. The auxiliary power supply 3241 may include super capacitors capable of storing the power PWR.

The SSD controller 3210 may exchange signals SGL with the host device 3100 through the signal connector 3250. Here, the signals SGL may include commands, addresses, data, or the like. The signal connector 3250 may include a connector such as PATA (Parallel Advanced Technology Attachment), SATA (Serial Advanced Technology Attachment), SCSI (Small Computer System Interface), or SAS (Serial Attached SCSI), according to the interface scheme between the host device 3100 and the SSD 3200.

Figure 12:
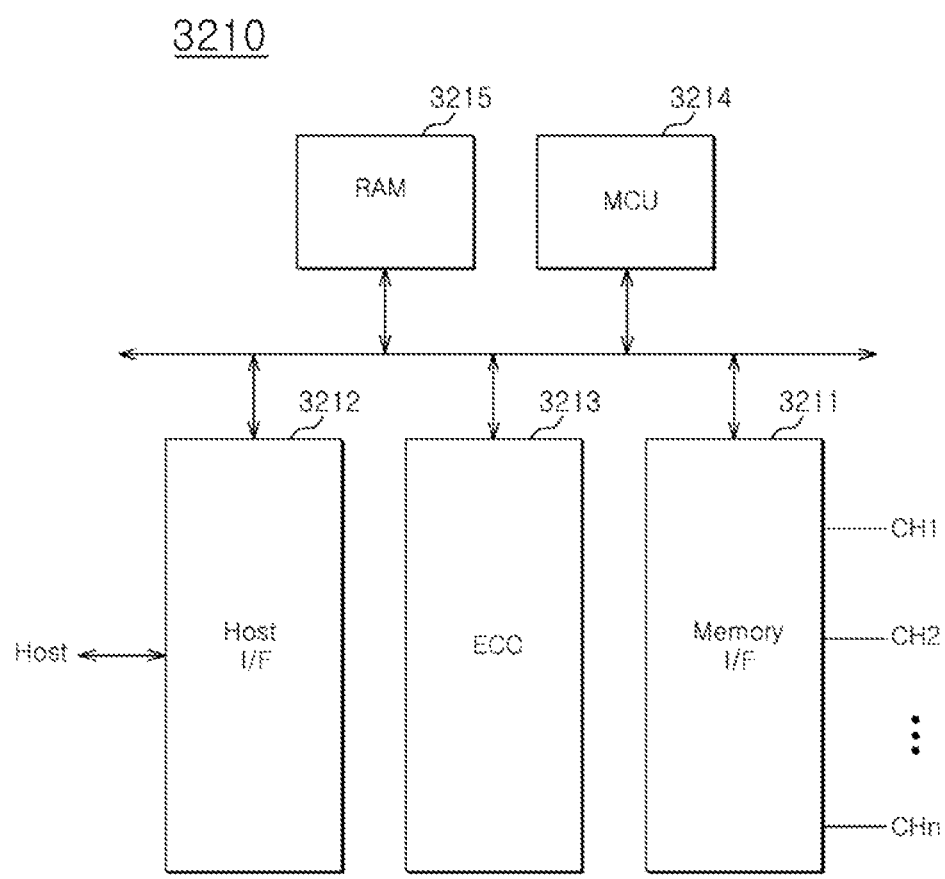
FIG. 12 is a block diagram illustrating an exemplary SSD controller illustrated in FIG. 11.

FIG. 12 is a block diagram illustrating the SSD controller illustrated in FIG. 11. Referring to FIG. 12, the SSD controller 3210 may include a memory interface 3211, a host interface 3212, an ECC unit 3213, a micro control unit 3214, or a RAM 3215.

The memory interface 3211 may provide a command and address to the nonvolatile memory devices 3231 to 323n. Furthermore, the memory interface 3211 may exchange data with the nonvolatile memory devices 3231 to 323n. The memory interface 3211 may scatter data transferred from the buffer memory device 3220 over the respective channels CH1 to CHn, according to the control of the micro control unit 3214. Furthermore, the memory interface 3211 may transfer data read from the nonvolatile memory devices 3231 to 323n to the buffer memory device 3220, according to the control of the micro control unit 3214.

The host interface 3212 may interface the SSD 3200 in response to the protocol of the host device 3100. For example, the host interface 3212 may communicate with the host device 3100 through one of PATA (Parallel Advanced Technology Attachment), SATA (Serial Advanced Technology Attachment), SCSI (Small Computer System Interface), or SAS (Serial Attached SCSI) protocols. Furthermore, the host interface 3212 may perform a disk emulation function of supporting the host device 3100 to recognize the SSD 3200 as a hard disk drive (HDD).

The ECC unit 3213 may generate parity bits based on the data transmitted to the nonvolatile memory devices 3231 to 323*n*. The generated parity bits may be stored in spare areas of the nonvolatile memory devices 3231 to 323*n*. The ECC unit 3213 may detect an error of data read from the nonvolatile memory devices 3231 to 323*n*. If the detected error falls within a correction range, the ECC unit 3213 may correct the detected error.

The micro control unit 3214 may analyze and process a signal SGL inputted from the host device 3100. The micro control unit 3214 may control overall operations of the SSD controller 3210 in response to a request of the host device 3100. The micro control unit 3214 may control the operations of the buffer memory device 3220 and the nonvolatile memory devices 3231 to 323*n* according to firmware for driving the SSD 3200. The RAM 3215 is used as a working memory device for driving the firmware.

Figure 13:
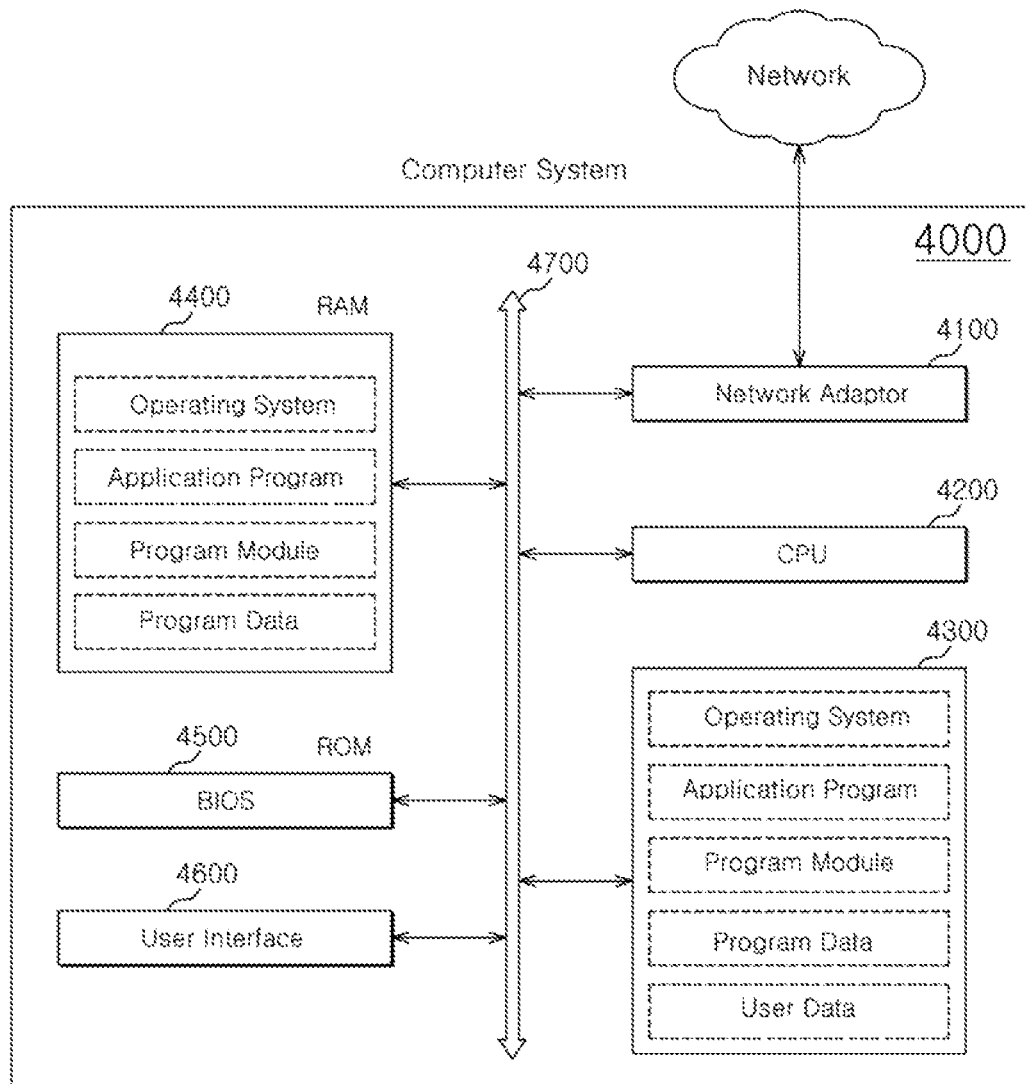
FIG. 13 is a block diagram illustrating an exemplary computer system.

FIG. 13 is a block diagram illustrating an exemplary computer system in which the exemplary data storage device is implemented. Referring to FIG. 13, the computer system 4000 may include a network adapter 4100, a CPU 4200, a data storage device 4300, a RAM 4400, a ROM 4500, or a user interface 4600, which are electrically coupled to the system bus 4700. Here, the data storage device 4300 may include the data storage device 120 illustrated in FIG. 1, the data storage device 1200 illustrated in FIG. 8, or the SSD 3200 illustrated in FIG. 11.

The network adapter 4100 may provide an interface between the computer system 4000 and external networks. The CPU 4200 may perform overall arithmetic operations for driving an operating system or application programs staying in the RAM 4400.

The data storage device 4300 may store overall data required by the computer system 4000. For example, the operating system for driving the computer system 4000, application programs, various program modules, program data, and user data may be stored in the data storage device 4300.

The RAM 4400 may be used as a working memory device of the computer system 4000. During booting, the operating system, application programs, various program modules, which are read from the data storage device 4300, and program data required for driving the programs are loaded into the RAM 4400. The ROM 4500 may store a basic input/output system (BIOS), which is enabled before the operating system is driven. Through the user interface 4600, information exchange is performed between the computer system 4000 and a user.

Although not illustrated in the drawing, the computer system 4000 may further include a battery, application chipsets, a camera image processor (CIP), or the like.

While certain implementations have been described above, it will be understood to those skilled in the art that the implementations described are by way of example only. Accordingly, the data storage device described herein should not be limited based on the described implementations. Rather, the data storage device described herein should only be limited in light of the claims that follow when taken in conjunction with the above description and accompanying drawings.

What is claimed is:

1. An operating method of a data storage device, the operating method comprising the steps of:
    reading a first data group associated with the data storage device;
    detecting errors in the first data group;
    correcting the errors in the first data group, if the errors detected in the first data group can be corrected;
    estimating a read retry estimation voltage for a subsequent read retry operation of a second data group that is different than the first data group and associated with the data storage device based on error correction data associated with the correcting the errors of the first data group.

2. The operating method according to claim 1, further comprising the steps of:
    reading the second data group;
    detecting errors in the second data group; and
    performing a read retry operation of the second data group using the read retry estimation voltage, if the errors detected in the second data group cannot be corrected.

3. The operating method according to claim 2, wherein a read retry voltage used during an initial read retry operation is set as the read retry estimation voltage.

4. The operating method according to claim 3, wherein the read retry voltage is varied when the read retry operation is repeated.

5. The operating method according to claim 4, wherein the read retry voltage increases when the read retry operation is repeated.

6. The operating method according to claim 4, wherein the read retry voltage decreases when the read retry operation is repeated.

7. The operating method according to claim 1, wherein the first data group comprises first state data having a threshold voltage that is lower than a read voltage and second state data having a threshold voltage that is higher than the read voltage,
    wherein the error correction data comprises corrected error data of the first state data and corrected error data of the second state data, and
    wherein a shift direction and a shift amount of the read retry estimation voltage, which is shifted on the basis of the read voltage, are varied based on a number of the corrected error data of the first state data and a number of the corrected error data of the second state data.

8. The operating method according to claim 7, wherein, if the number of the corrected error data of the second state data is larger than the number of the corrected error data of the first state data, then the read retry estimation voltage is set to a higher level than the read voltage.

9. The operating method according to claim 7, wherein, if the number of the corrected error data of the first state data is larger than the number of the corrected error data of the second state data, then the read retry estimation voltage is set to a lower level than the read voltage.

10. The operating method according to claim 7, wherein, as a difference between the number of the corrected error data of the first state data and the number of the corrected error data of the second state data increases, the shift amount of the read retry estimation voltage increases.

11. The operating method according to claim 7, wherein, as a difference between the number of the corrected error data of the first state data and the number of the corrected error data of the second state data decreases, the shift amount of the read retry estimation voltage decreases.

12. A data storage device comprising:
a nonvolatile memory device; and
a memory controller configured to:
read a first data group from the nonvolatile memory device, correct errors detected in the read first data group, and
estimate a read retry estimation voltage for a subsequent read retry operation of a second data group that is different than the first data group and associated with the data storage device based on error correction data acquired when the detected errors are corrected.

13. The data storage device according to claim 12, wherein the memory controller is further configured to:
read the second data group from the nonvolatile memory device, and
perform a read retry operation of the second data group using the read retry estimation voltage, if errors detected in the second data group cannot be corrected.

14. The data storage device according to claim 13, wherein the controller comprises:
a working memory device to store a value of the read retry estimation voltage until the read retry operation is performed.

15. The data storage device according to claim 13, wherein the controller is further configured to:
set a read retry voltage, used during an initial read retry operation, as the read retry estimation voltage.

16. The data storage device according to claim 15, wherein the controller is further configured to:
vary the read retry voltage when the read retry operation is repeated.

17. The data storage device according to claim 12, wherein the first data group comprises first state data having a threshold voltage that is lower than a read voltage and second state data having a threshold voltage that is higher than the read voltage,
wherein the error correction data comprise corrected error data of the first state data and corrected error data of the second state data, and
wherein the controller is further configured to:
vary a shift direction and a shift amount of the read retry estimation voltage, which is shifted on the basis of the read voltage, based on a number of the corrected error data of the first state data and a number of the corrected error data of the second state data.

18. The data storage device according to claim 17, wherein, if the number of the corrected error data of the second state data is larger than the number of the corrected error data of the first state data, then the controller is further configured to:
set the read retry estimation voltage to a higher level than the read voltage.

19. The data storage device according to claim 17, wherein, if the number of the corrected error data of the first state data is larger than the number of the corrected error data of the second state data, then the controller is further configured to:
set the read retry estimation voltage to a lower level than the read voltage.

20. The data storage device according to claim 17, wherein, as a difference between the number of the corrected error data of the first state data and the number of the corrected error data of the second state data increases, then the controller is further configured to:
increase the shift amount of the read retry estimation voltage.

21. The data storage device according to claim 17, wherein, as a difference between the number of the corrected error data of the first state data and the number of the corrected error data of the second state data decreases, then the controller is further configured to:
decrease the shift amount of the read retry estimation voltage.

22. A data processing system comprising:
a host device; and
a data storage device configured to store data processed by the host device,
wherein the data storage device comprises:
a nonvolatile memory device; and
a memory controller configured to:
read a first data group from the nonvolatile memory device, correct errors detected in the read first data group, and
estimate a read retry estimation voltage for a subsequent read retry operation of a second data group that is different than the first data group and associated with the data storage device based on error correction data acquired when the detected errors are corrected.

23. The data processing system according to claim 22, wherein the memory controller is further configured to:
read the second data group from the nonvolatile memory device, and
perform a read retry operation of the second data group using the read retry estimation voltage when errors detected in the second data group cannot be corrected.

24. The data processing system according to claim 23, wherein the controller is further configured to:
set a read retry voltage, used during an initial read retry operation, as the read retry estimation voltage.

25. The data processing system according to claim 24, wherein the controller is further configured to:
vary the read retry voltage when the read retry operation is repeated.

26. The data processing system according to claim 22, wherein the first data group comprises first state data having a threshold voltage that is lower than a read voltage and second state data having a threshold voltage that is higher than the read voltage,
wherein the error correction data comprise corrected error data of the first state data and corrected error data of the second state data, and
wherein the controller is further configured to:
vary a shift direction and a shift amount of the read retry estimation voltage, which is shifted on the basis of the read voltage, based on a number of the corrected error data of the first state data and a number of the corrected error data of the second state data.

27. The data processing system according to claim 26, wherein, if the number of the corrected error data of the second state data is larger than the number of the corrected error data of the first state data, then the controller is further configured to:
set the read retry estimation voltage to a higher level than the read voltage.

28. The data processing system according to claim 26, wherein, if the number of the corrected error data of the first state data is larger than the number of the corrected error data of the second state data, then the controller is further configured to:
set the read retry estimation voltage to a lower level than the read voltage.

29. The data processing system according to claim 26, wherein, as a difference between the number of the corrected error data of the first state data and the number of the corrected error data of the second state data increases, the controller is further configured to:

increase the shift amount of the read retry estimation voltage.

30. The data processing system according to claim 26, wherein, as a difference between the number of the corrected error data of the first state data and the number of the corrected error data of the second state data decreases, the controller is further configured to:

decrease the shift amount of the read retry estimation voltage.

* * * * *